United States Patent [19]
Yamamura

[11] 3,716,383
[45] Feb. 13, 1973

[54] APPARATUS FOR THE PRODUCTION OF SNACK FOOD

[76] Inventor: Koji Yamamura, 10-11, 1-chome, Minemachi, Chofu, Tokyo, Japan

[22] Filed: Sept. 25, 1970

[21] Appl. No.: 75,476

[52] U.S. Cl. .................. 99/353, 99/80 R, 99/85, 99/100 P
[51] Int. Cl. .................. A47j 37/12, A23l 1/10
[58] Field of Search ....99/100 P, 307, 308, 353, 355, 99/80, 81, 85

[56] References Cited

UNITED STATES PATENTS

| | | | |
|---|---|---|---|
| 2,549,283 | 4/1951 | Ashton | 99/408 |
| 2,886,439 | 5/1959 | Eytinge | 99/353 |
| 3,020,162 | 2/1962 | Cunningham et al. | 99/80 R |
| 3,336,137 | 8/1967 | Hickey | 99/80 R |

*Primary Examiner*—Raymond N. Jones
*Attorney*—Ernest A. Greenside

[57] ABSTRACT

The material of food is first supplied into a supply source and is then divided into a proper amount by a rotary feed drum having several recesses for a further intermittent feed of the material through a guide hopper into an oil tank serving as a fry pan provided at the bottom of the apparatus. The fried material is continuously taken up for the edible oil with an action of a rotary vane and is then blown away by a blower onto an oil strainer means for removing the residual oil and finally the resultant snack food is collected in a container.

3 Claims, 3 Drawing Figures

PATENTED FEB 13 1973 3,716,383

INVENTOR
KOJI YAMAMURA

APPARATUS FOR THE PRODUCTION OF SNACK FOOD

BACKGROUND OF THE INVENTION

The present invention relates to an automatic method of and apparatus for the production of snack food such as popcorn, potato-chip, noodles and the like.

Generally, the material after being fried becomes bulky and requires a space of approximately ten times the raw material before fried. Accordingly, equipment to be used for such purpose must itself be bulky to accommodate the fried product.

SUMMARY OF THE INVENTION

A primary object of the present invention is to provide an automatic and continuous method and apparatus for producing snack food in a selected amount with a ready operation at the shop.

A further object of the present invention is to provide such a continuous method of producing snack food wherein the material of food is supplied into a supply source and is then divided into a proper amount by a rotary feed drum for a further intermittent feed of the material into an oil tank serving as a fry pan and the fried material is continuously taken up from the oil with a rotary vane and subsequently blown away by a blower onto an oil strainer for removing the residual oil and finally the resultant snack food is collected in a container. Usually, the material is once precipitated in the oil and, after fried thus reduction of specific gravity, comes to the surface of the boiling oil.

A further important object of the present invention is to provide a new automatic apparatus for producing snack food which comprises a supply source of the material incorporated with a rotary feed drum having several recesses for dividing the material into a proper amount, a guide hopper for communicating said supply source of the material with an oil tank serving as a fry pan, a rotary vane provided in the oil tank, an oil strainer means for removing the residual oil and a container for collecting the fried material.

The relatively low rotating speed of the rotary feed drum at approximately 6 rpm is accorded with that of the rotary vane so that a proper balance is maintained between the supply speed of the material and the frying rate of the material.

These and other objects of the invention will be apparent as the description proceeds in particular reference to the attached drawing, in which;

DESCRIPTION OF THE PREFERRED EMBODIMENT

Figure 1:
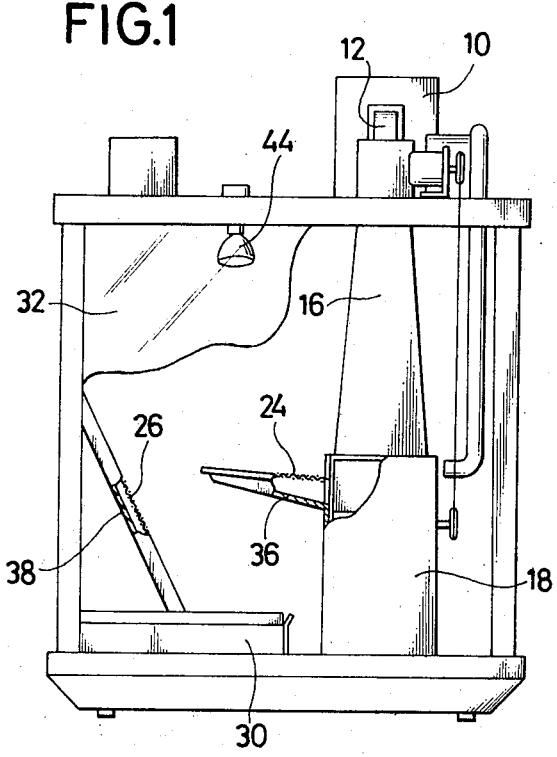
FIG. 1 is a schematic front elevation in partially sectioned of the apparatus for the production of snack food according to the invention.

There is shown in the drawing a typical apparatus by means of which the preferred method of the present invention can be accomplished.

Figure 2:
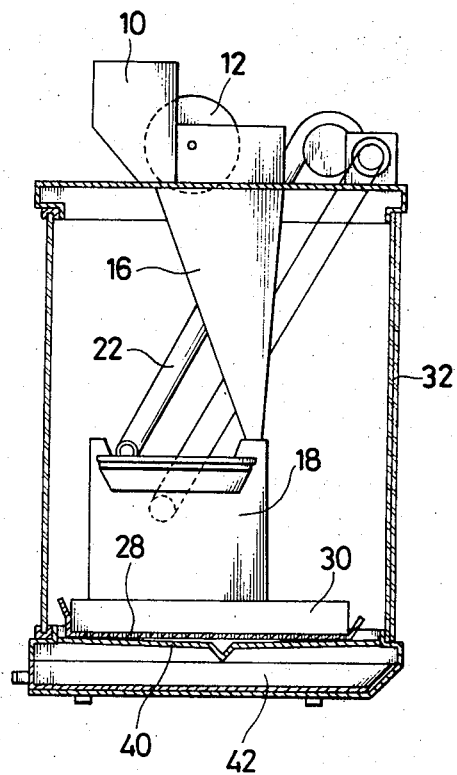
FIG. 2 is a sectional elevation taken along the line designated II—II of FIG. 1.

In FIGS. 1 and 2 of the application drawing, the apparatus for embodying the novel method according to the invention comprises, a supply funnel 10 for supplying the material, a rotary feed drum 12 provided with four recesses 14 for separating the material into a proper amount, a guide hopper 16 for communicating the supply funnel 10 with an oil tank 18 serving as a fry pan and provided at the bottom of the apparatus, a rotary vane 20 arranged in the oil tank 18 for the take-up of the fried material floating on the boiling edible oil, a blower 22 for blowing away the fried material on the vane, an oil strainer comprising a first screen 24, a second screen 26 and a third screen 28 and a container 30 for collecting the treated product. All these components are accommodated in a housing 32 of heat resisting glass.

Figure 3:
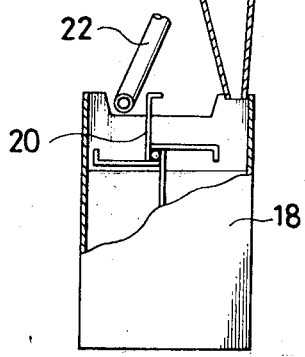
FIG. 3 is a partially and longitudinally sectioned view of FIG. 2.

As best shown in FIG. 3, the supply funnel 10 of the material at its one lower side portion is incorporated with the rotary feed drum 12 which is provided with four recesses 14 for dividing the material into a proper amount. The supply funnel 10 at its conical inner wall portion is welded with one end of a stirring piece 34 and the other end thereof is extended to be in contact with the peripheral edge of the drum 12 so that the stirring piece 34 is oscillated during the revolution of the rotary feed drum 12 thereby facilitating the introduction of the material from the supply source 10 into the recess 14.

The rotary feed drum 12 is partially accommodated in the upper end portion of the guide hopper 16 having a constricted end opened into the oil tank 18 in which a rotary vane 20 for the take-up of the fried material is arranged. As best shown in FIG. 3, an outer end of the vane 20 is bent at a right angle to the straight portion of the vane so that the material floating on the oil is tangibly taken up by the vanes.

At one side of the rotary vane, there is opened an end of the blowing tube 22 to blow away the material taken up from the oil by the vanes 20.

As best shown in FIG. 1, the oil strainer means comprises a first screen 24 extending from the other upper side of the oil tank 18 with an oil-drip plate 36, a second screen 26 with an oil-drip plate 38 provided on the inner wall of the casing 32 in opposite and tilting relation to the first screen 24 and a third screen 28 with an oil-drip plate 40 provided horizontally at the bottom of the container 30 to receive the fried material sliding down along the second screen 26. By this construction, the residual oil of the fried material may be completely removed. The removed oil is finally recovered in the oil-drip pan 42. it will be appreciated that the screens may be wire net or heat resisting porous board.

At the upper end of the casing 32, there is provided a sterilizing lamp 44 for irradiating the interior of the casing 32 while keeping the environment sanitarily in good condition. Further, the casing at its selected portion is provided with an air vent with a small fan (not shown) to exhaust the smoke developed in the casing.

In the preferred operation of the apparatus according to the present invention, the material of food is supplied into the supply funnel 10 and subsequently divided into a proper amount by the rotating feed drum 12 for dropping the material intermittently into the oil tank 18 with boiling edible oil through the guide hopper 16. The material is once precipitated into the oil and, after fried, comes to the surface of the boiling oil for the continuous take-up operation by the rotating vanes 20. The material on the vane is blown away by the action of the blower and runs over the first and second screens 24 and 26 onto the third screen 28 while removing the residual oil. The thus treated material is collected in the container 30.

As illustrated above according to the present invention, the production of the fried food may be carried out automatically and continuously at the shop by an apparatus of simple construction with ready operation.

While certain preferred embodiments of the invention have been illustrated by way of example in the drawings and particularly described, it will be understood that various modifications may be made in the methods and constructions and that the invention is no way limited to the embodiments shown.

What we claim is;

1. An apparatus for producing a food product of the type capable of being mouthed in its entirety in a single feeding, said apparatus comprising a supply source of the food product in its raw state, a rotary drum having a plurality of discrete recesses separated from one another, each recess being in communication during said drum rotation with the supply source for receiving therefrom a predetermined quantity of the product determined by the recess size, a guide hopper having one end disposed in relation to said drum to receive therefrom an intermittent supply of said product as a function of drum rotation, an oil reservoir serving as a fry pan to which the opposite end of the hopper is connected, a rotary vane in the oil reservoir for removing fried products from the oil, blower means for blowing the fried product from the rotary vane, oil strainer means for receiving said fried product from the rotary vane when blown therefrom and for removing residual oil from the product, and a container for collecting said fried product supplied thereto by said oil strainer means.

2. An apparatus according to claim 1, wherein said supply source comprises a funnel having a constricted portion provided with a stirring member having an end in contact with a peripheral edge of the drum.

3. An apparatus according to claim 1, wherein said oil strainer means comprises a first screen extending from the upper end portion of the oil reservoir, a second screen provided in opposed and tilting relation to the first screen, and a third screen provided at the bottom of the container to receive fried material.

* * * * *